(12) United States Patent
Shioiri et al.

(10) Patent No.: US 11,768,647 B2
(45) Date of Patent: Sep. 26, 2023

(54) RECORDING APPARATUS AND RECORDING METHOD

(71) Applicant: CANON KABUSHIKI KAISHA, Tokyo (JP)

(72) Inventors: Hiroyuki Shioiri, Kanagawa (JP); Kazuya Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 17/673,349

(22) Filed: Feb. 16, 2022

(65) Prior Publication Data

US 2022/0283763 A1 Sep. 8, 2022

(30) Foreign Application Priority Data

Mar. 8, 2021 (JP) ................. 2021-036216

(51) Int. Cl.
| | |
|---|---|
| *G06F 3/12* | (2006.01) |
| *G06K 15/02* | (2006.01) |
| *H04N 1/00* | (2006.01) |
| *B41J 2/21* | (2006.01) |
| *B41J 2/045* | (2006.01) |

(52) U.S. Cl.
CPC ........ *G06F 3/1265* (2013.01); *B41J 2/04505* (2013.01); *B41J 2/2146* (2013.01); *G06F 3/121* (2013.01); *H04N 1/00005* (2013.01)

(58) Field of Classification Search
None
See application file for complete search history.

(56) References Cited

U.S. PATENT DOCUMENTS

| | | | | |
|---|---|---|---|---|
| 8,437,035 B2 * | 5/2013 | Negishi | ............. | G03G 15/5095 358/1.9 |
| 2018/0314471 A1 * | 11/2018 | Yamakawa | ........... | G06F 3/1258 |

FOREIGN PATENT DOCUMENTS

| | | | | |
|---|---|---|---|---|
| JP | H1013674 A | | 1/1998 | |
| JP | 2002333744 | * | 11/2002 | ................ B41J 5/30 |
| JP | 2004325515 | * | 11/2004 | ............... H04N 1/04 |
| JP | 2007176119 | * | 7/2007 | ............. B41J 11/42 |
| JP | 2016016588 | * | 2/2016 | ............... G06F 3/12 |

* cited by examiner

*Primary Examiner* — Beniyam Menberu
(74) *Attorney, Agent, or Firm* — Canon U.S.A., Inc. I.P. Division

(57) ABSTRACT

A recording apparatus includes a recording unit, first and second holding units, and a generation unit. The recording unit records an image on a recording medium, conveyed in a second direction, by using recording elements arranged along a first direction. The generation unit generates first correction data based on an input recording job and image data and a first adjustment value indicating a conveyance position, in the first direction, of a recording medium from the first holding unit, and generates second correction data based on the recording job and the image data and a second adjustment value indicating a conveyance position, in the first direction, of a recording medium from the second holding unit. The recording unit records an image on the first holding unit recording medium based on the first correction data, and records an image on the second holding unit recording medium based on the second correction data.

12 Claims, 10 Drawing Sheets

FIG.6

| SPOOL ID | ADDRESS | SIZE | JOB ID | PAGE NUMBER | CORRESPONDING SHEET FEEDING CASSETTE |
|---|---|---|---|---|---|
| 0001 | 0x80000000 | 0x2000 | 0003 | 1 | 1 |
| 0002 | 0x80002000 | 0x2000 | 0003 | 1 | 2 |
| 0003 | 0x80004000 | 0x2000 | 0004 | 1 | 1,2 |
| 0004 | 0x80006000 | 0x2000 | 0004 | 2 | 1,2 |
| 0005 | 0x80008000 | 0x2000 | 0005 | 1 | 1 |
| 0006 | 0x8000a000 | 0x2000 | 0005 | 1 | 2 |
| 0007 | 0x8000c000 | 0x2000 | 0005 | 2 | 1 |
| 0008 | 0x8000e000 | 0x2000 | 0005 | 2 | 2 |

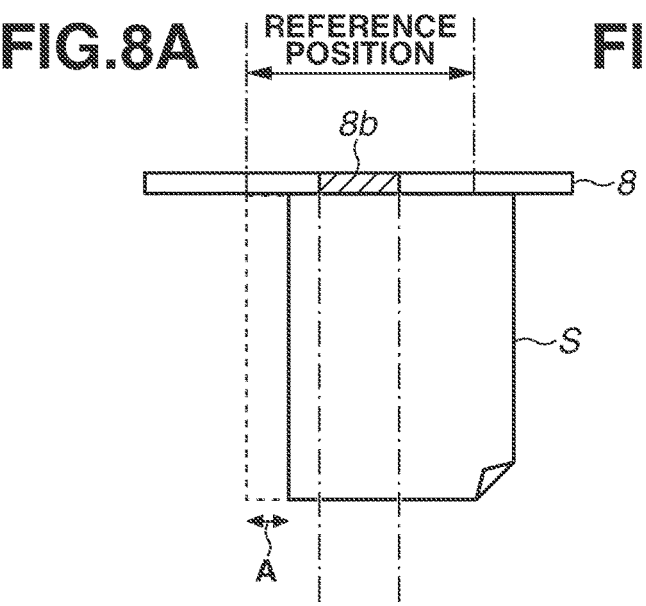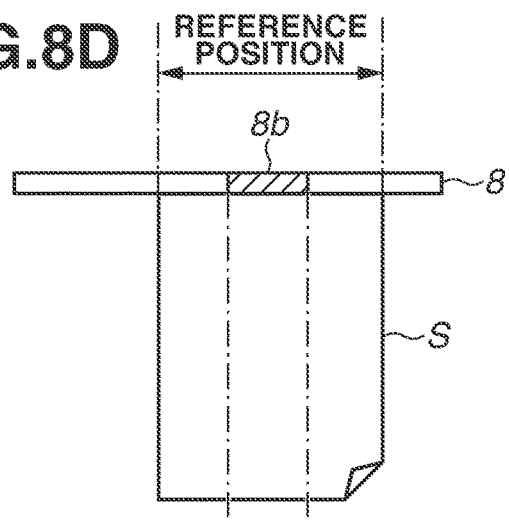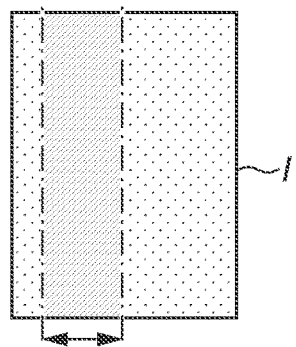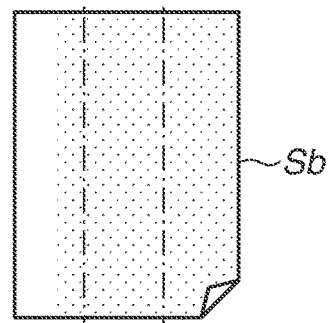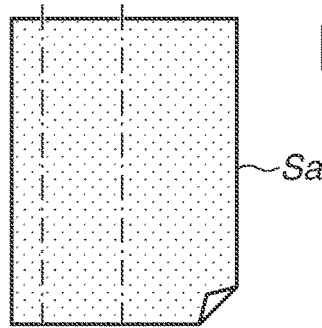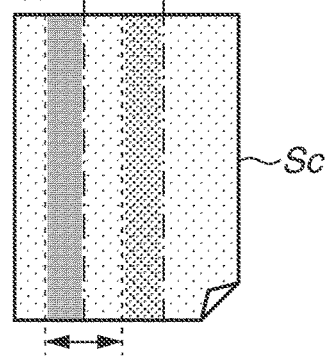

RECORDING APPARATUS AND RECORDING METHOD

BACKGROUND

Field

The present disclosure relates to a recording apparatus and a recording method for recording an image on a recording medium.

Description of the Related Art

There is known a conventional recording apparatus that records an image on a recording medium by applying a recording material such as ink to the recording medium. As the recording apparatus, a full-multi type recording apparatus is known. The full-multi type recording apparatus includes a recording head in which a plurality of nozzles including recording elements such as heating elements is arranged to have a width greater than or equal to a sheet width in a direction intersecting with a sheet conveyance direction. Each of the nozzles is a minimum unit of ink application. The recording head having the foregoing structure will be referred to as the "line head". The recording apparatus forms an image of one page by forming an output image corresponding to one raster in a direction parallel to the line head through one ink ejection from the recording head for each color, and repeating the ink ejection operation in synchronization with the conveyance of the sheet by a line feed motor. This enables high-speed recording.

Due to a manufacturing error of the line head, there is a case where nozzle tip diameters, and amounts and directions of ink droplets ejected by the recording elements vary among the nozzles or the recording head chips. Thus, even in a case where recording heads are manufactured through the same process, actual recording densities may vary, and this causes an issue where such density variation is visually recognized as density unevenness on recorded images.

A head shading (HS) technique is known as a correction method for making the density unevenness less visible, as discussed in Japanese Patent Application Laid-Open No. 10-013674. With the HS technique, a density value of an ink color ejected from each nozzle is corrected based on an ejection characteristic of the nozzle.

SUMMARY

The present disclosure is directed to preventing a decrease in recorded image quality in a case where a sheet feeding source in a recording apparatus including a plurality of sheet feeding cassettes is changed.

According to an aspect of the present disclosure, a recording apparatus includes a recording unit configured to record an image on a recording medium conveyed in a second direction, wherein the recording unit records the image by using a plurality of recording elements arranged along a first direction intersecting with the second direction, a first holding unit and a second holding unit each configured to hold a plurality of recording media, a generation unit configured to generate first correction data and second correction data based on an input recording job, wherein the generation unit generates the first correction data based on input image data and a first adjustment value indicating a conveyance position, in the first direction, of a recording medium fed from the first holding unit, and generates the second correction data based on the input image data and a second adjustment value indicating a conveyance position, in the first direction, of a recording medium fed from the second holding unit, and a control unit configured to control the recording unit, wherein the control unit controls the recording unit to record an image on the recording medium fed from the first holding unit based on the first correction data, and to record an image on the recording medium fed from the second holding unit based on the second correction data.

Further features of the present disclosure will become apparent from the following description of exemplary embodiments with reference to the attached drawings.

BRIEF DESCRIPTION OF THE DRAWINGS

FIG. 6 is a diagram illustrating an example of spool management data.

FIGS. 8A to 8F are diagrams illustrating an issue to be addressed according to an exemplary embodiment of the present disclosure.

DESCRIPTION OF THE EMBODIMENTS

An exemplary embodiment of the present disclosure will be described below with reference to the drawings. In the present exemplary embodiment, an inkjet recording apparatus is used as a recording apparatus. Hereinafter, a recording medium will be referred to as a "sheet", and a recording material that is applied to the recording medium will be referred to as "ink". The recording apparatus according to the present exemplary embodiment is not limited to the ink jet recording apparatus and may be a recording apparatus using an electrophotographic method. Similarly, the recording medium according to the present exemplary embodiment is not limited to the sheet, and the recording material according to the present exemplary embodiment is not limited to the ink.

<Inkjet Recording Apparatus>

Figure 1:
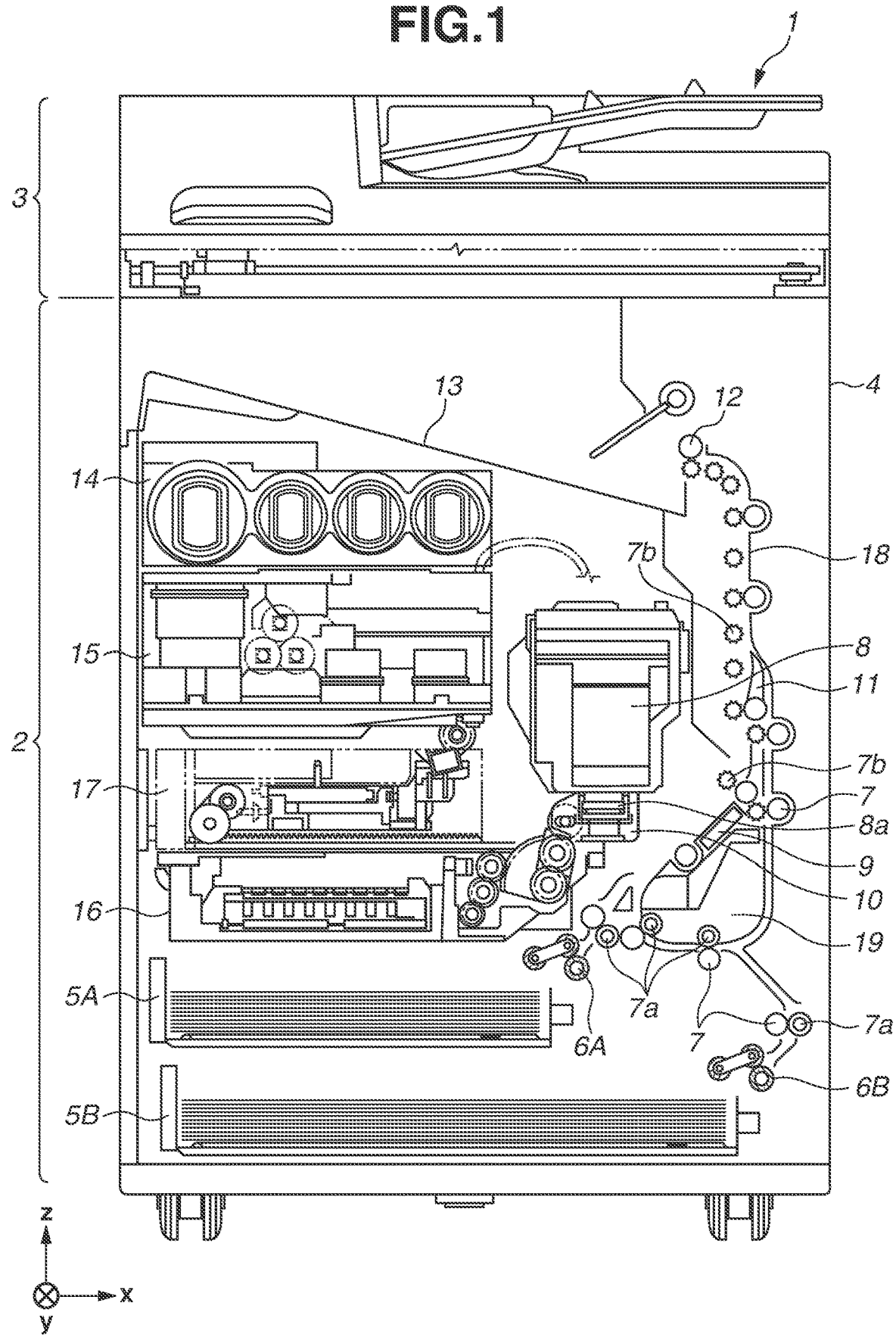
FIG. 1 is diagram illustrating a recording apparatus in a standby state.

FIG. 1 illustrates an internal configuration of an inkjet recording apparatus 1 (hereinafter referred to as a "recording apparatus 1") according to the present exemplary embodiment. In FIG. 1, an x-direction is a horizontal direction, a y-direction (perpendicular to the paper surface of the drawing) is a direction in which a plurality of recording elements of a recording head 8 (described below) is arranged, and a z-direction is a vertical direction.

The recording apparatus 1 is a multi-function peripheral including a printing unit 2 and a scanner unit 3, and performs various types of processing related to recording and reading operations by using the printing unit 2 and the scanner unit 3 individually or in combination. The scanner unit 3 includes an auto document feeder (ADF) and a flatbed scanner (FBS). The scanner unit 3 reads a document automatically fed by the ADF, and also reads (scans) a document placed on a platen glass of the FBS by a user. While the recording apparatus 1 according to the present exemplary embodiment is the multi-function peripheral including the printing unit 2 and the scanner unit 3, the recording apparatus 1 without the scanner unit 3 may be employed.

The printing unit 2 includes a first sheet feeding cassette 5A and a second sheet feeding cassette 5B. Each of the first sheet feeding cassette 5A and the second sheet feeding cassette 5B serves as a holding unit capable of holding a plurality of cut sheets (sheets S), and is removably placed in a lower bottom portion of a housing 4 of the printing unit 2 in the vertical direction. FIG. 1 illustrates a state where A4-size sheets are flat stacked in the first sheet feeding cassette 5A, and A3-size sheets are flat stacked in the second sheet feeding cassette 5B. In processing in each flowchart to be described below, it is assumed that the first sheet feeding cassette 5A and the second sheet feeding cassette 5B hold the sheets S of the same type and the same size (A4-size plain sheets). While in the present exemplary embodiment, a configuration in which two sheet feeding cassettes (the first sheet feeding cassette 5A and the second sheet feeding cassette 5B) are included is described, a configuration in which three or more sheet feeding cassettes are included may be employed. The present exemplary embodiment is effective in a configuration in which two or more sheet feeding cassettes are capable of holding sheets of the same size and the same type.

A first feeding unit 6A for separating and feeding the held sheets S one by one is provided near the first sheet feeding cassette 5A. Similarly, a second feeding unit 6B is provided near the second sheet feeding cassette 5B. During a recording operation, the sheets S are fed selectively from one of the first feeding unit 6A and the second feeding unit 6B.

Conveyance rollers 7, a discharge roller 12, pinch rollers 7a, spurs 7b, a guide 18, and an inner guide 19, and a flapper 11 are a conveyance mechanism for conveying the sheet S to a recording position where the recording head 8 performs recording. Each of the conveyance rollers 7 is a driving roller disposed upstream of the recording head 8 and driven by a conveyance motor (not illustrated). Each of the pinch rollers 7a is a driven roller that rotates while nipping the sheet S together with the corresponding conveyance roller 7. The discharge roller 12 is a driving roller disposed downstream of the recording head 8 and driven by a conveyance motor (not illustrated). The spurs 7b convey the sheet S while sandwiching the sheet S together with the discharge roller 12.

The guide 18 is provided in a conveyance path for conveying the sheet S, and guides the sheet S to a predetermined direction. The inner guide 19 is a member extending in the y-direction with a curved side surface and guides the sheet S along the side surface. The flapper 11 is a member for switching the conveyance direction of the sheet S during a two-sided recording operation. A discharge tray 13 stacks and holds the sheets S discharged by the discharge roller 12 after the recording operation is completed.

The recording head 8 according to the present exemplary embodiment is a full-line type color inkjet recording head. Based on recording data, recording elements of the recording head 8 are driven to eject ink from nozzles of the recording head 8.

The nozzles of the recording head 8 are arranged along the y-direction in FIG. 1. The number of nozzles corresponds to the width of the sheet S.

Figure 9:
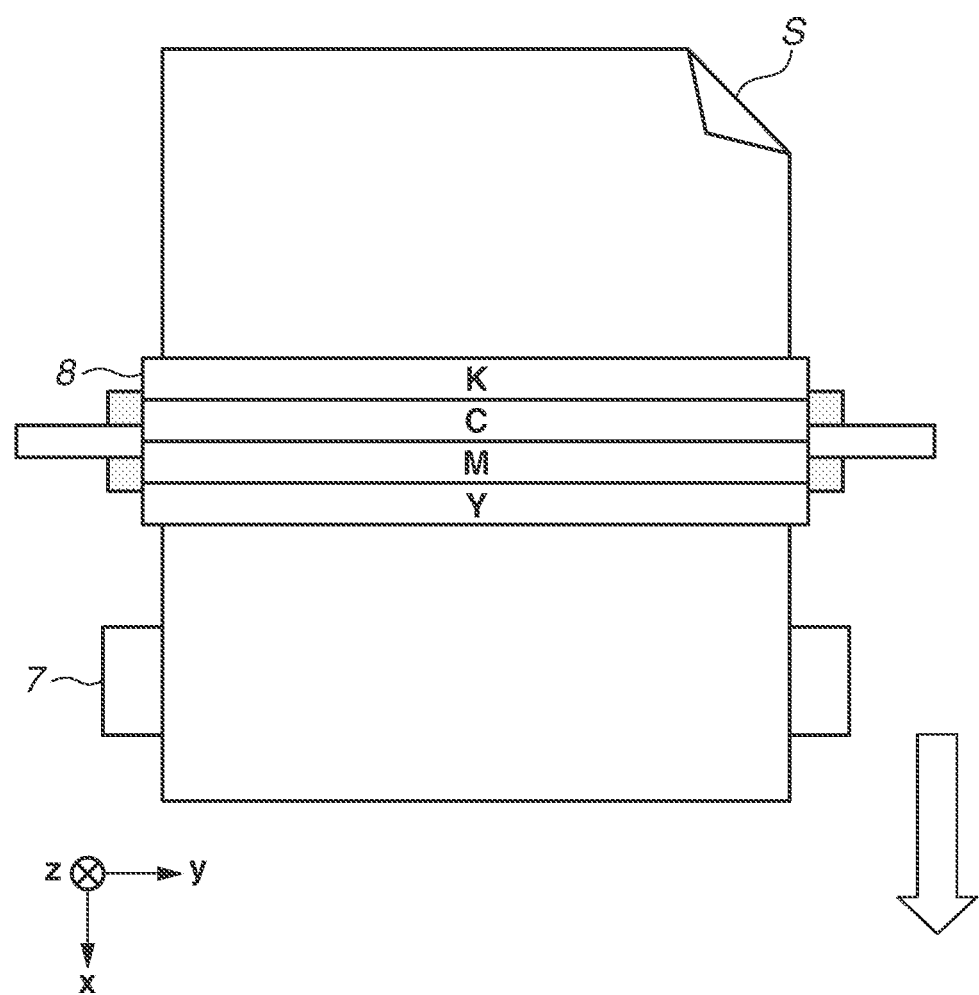
FIG. 9 is a diagram illustrating a recording head.

FIG. 9 illustrates a positional relationship between the recording head 8 and the sheet S. As illustrated in FIG. 9, the recording head 8 according to the present exemplary embodiment includes four recording heads for black (K), cyan (C), magenta (M), and yellow (Y). Each of the recording heads for K, C, M, and Y includes the recording elements arranged along the y-direction in FIG. 9 so as to correspond to the width of the sheet S in the y-direction. In other words, an image can be recorded while the sheet S is conveyed once in the x-direction. The recording elements according to the present exemplary embodiment are inkjet recording elements using a thermal recording method of converting electric energy into thermal energy to generate heat, thereby ejecting ink droplets from the nozzles. While in the recording operation according to the present exemplary embodiment, the sheet S is conveyed to the recording head 8 disposed at a fixed position to record an image on the sheet S, this is not restrictive. Any configuration in which the recording head 8 and the sheet S are relatively moved may be employed. For example, a configuration in which the recording head 8 is movable may be employed.

Returning to FIG. 1, while the recording head 8 is at a standby position, a nozzle surface 8a of the recording head 8 is capped by a cap unit 10 as illustrated in FIG. 1. During the recording operation to record an image on the sheet S, a print controller 202 (described below) changes an orientation of the recording head 8 so that the nozzle surface 8a faces a platen 9. The platen 9 is formed of a flat plate extending in the y-direction, and supports the sheet S conveyed to the recording position from a back surface of the sheet S.

An ink tank unit 14 includes four tanks respectively storing ink of the four colors to be supplied to the recording head 8. An ink supply unit 15 is provided in a flow passage connecting the ink tank unit 14 and the recording head 8, and adjusts the pressure and flow rate of the ink in the recording head 8 to a suitable range. In the present exemplary embodiment, a circulation-type ink supply configuration is employed, and the ink supply unit 15 adjusts the pressure of the ink to be supplied to the recording head 8 and the flow rate of the ink to be collected from the recording head 8 to a suitable range.

A maintenance unit 16 includes the cap unit 10 and a wiping unit 17. At predetermined timings, the maintenance unit 16 operates the cap unit 10 and the wiping unit 17 to perform a maintenance operation for the recording head 8.

Figure 2:
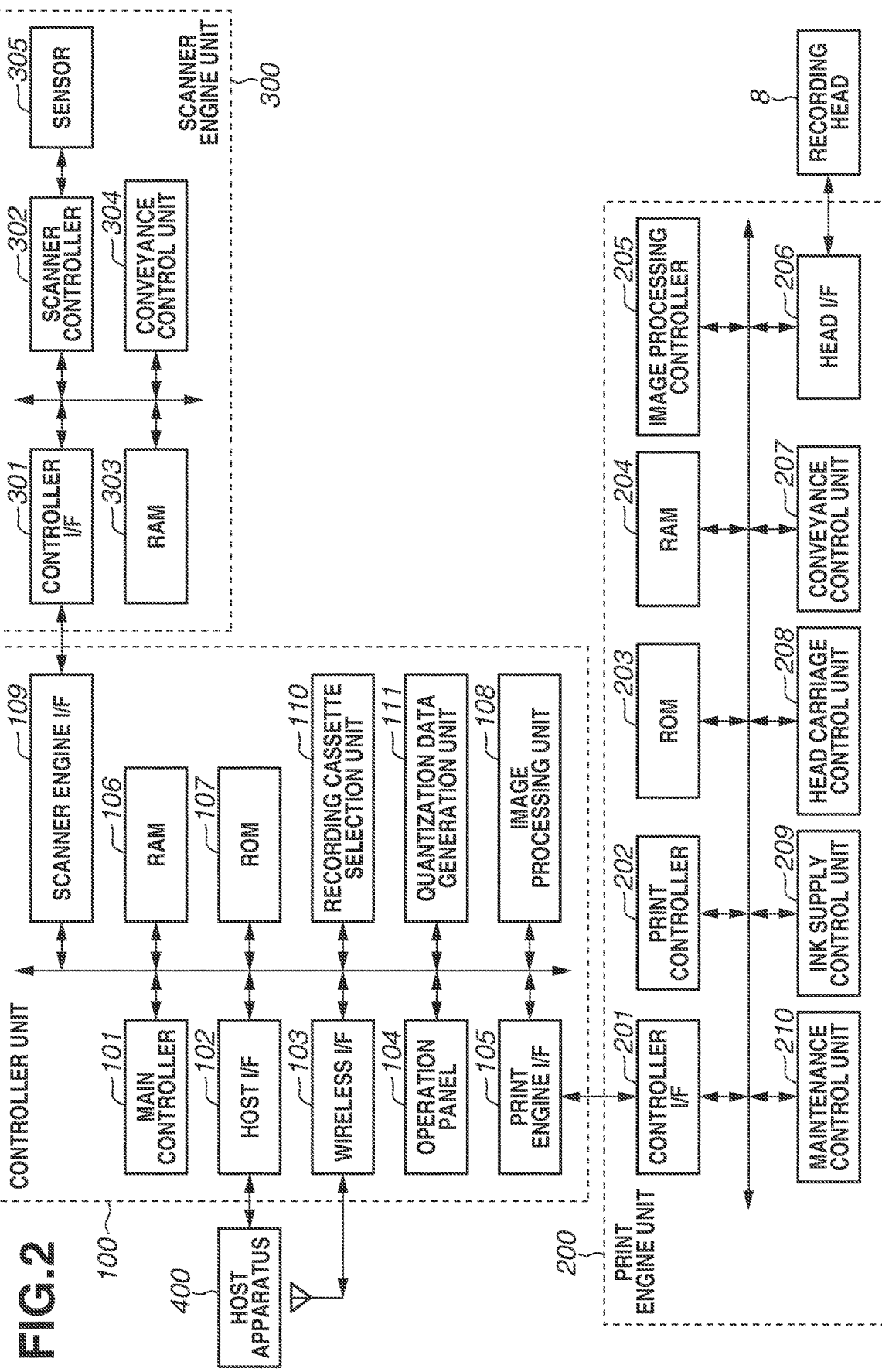
FIG. 2 is a diagram illustrating a control configuration of the recording apparatus.

FIG. 2 is a block diagram illustrating a control configuration of the recording apparatus 1. The control configuration mainly includes a print engine unit 200, a scanner engine unit 300, and a controller unit 100. The print engine unit 200 comprehensively controls the printing unit 2. The scanner engine unit 300 comprehensively controls the scanner unit 3. The controller unit 100 comprehensively controls the recording apparatus 1. The print controller 202 controls various mechanisms of the print engine unit 200 based on instructions from a main controller 101 of the controller unit 100. Various mechanisms of the scanner engine unit 300 are controlled by the main controller 101 of the controller unit 100. Details of the control configuration will be described next.

In the controller unit 100, the main controller 101 configured with a central processing unit (CPU) controls the entire recording apparatus 1 based on a program and various parameters stored in a read-only memory (ROM) 107, using a random access memory (RAM) 106 as a work area. For example, in a case where a recording job is input from a host apparatus 400 via a host interface (I/F) 102 or a wireless I/F 103, the main controller 101 stores the input data in the RAM 106. The main controller 101 then analyzes the input data and stores a job attribute for use in job processing and a page attribute for use in page processing in the RAM 106.

Based on an instruction from the main controller 101, a recording cassette selection unit 110 refers to sheet information about each of the sheet feeding cassettes (the first sheet feeding cassette 5A and the second sheet feeding cassette 5B) together with the job attribute and the page attribute stored in the RAM 106, and selects one or more sheet feeding cassettes capable of feeding the sheet S in the job. The sheet information about each of the sheet feeding cassettes (the first sheet feeding cassette 5A and the second sheet feeding cassette 5B) stored in the RAM 106 includes a sheet size, a sheet type, and a remaining sheet amount that are values detected by a sensor of each of the sheet feeding cassettes (the first sheet feeding cassette 5A and the second sheet feeding cassette 5B). The sheet information about each of the sheet feeding cassettes (the first sheet feeding cassette 5A and the second sheet feeding cassette 5B) may be set by the user via an operation panel 104 (described below).

A quantization data generation unit 111 transmits a quantization data request to an image processing unit 108 in order to generate quantization data corresponding to the sheet feeding cassette selected by the recording cassette selection unit 110. The image processing unit 108 generates the quantization data by performing raster image generation, correction processing, and quantization processing. In the correction processing, a sheet position adjustment value is used. The sheet position adjustment value indicates an amount of displacement, in the y-direction, of a conveyance position of the sheet S conveyed from each of the sheet feeding cassettes (the first sheet feeding cassette 5A and the second sheet feeding cassette 5B) from a reference position. The sheet position adjustment value is used to adjust a generation position of the quantization data corresponding to each of the nozzles. Since the recording apparatus 1 according to the present exemplary embodiment includes two sheet feeding cassettes (the first sheet feeding cassette 5A and the second sheet feeding cassette 5B), the sheet position adjustment value is set for each of the first sheet feeding cassette 5A and the second sheet feeding cassette 5B. The sheet position adjustment value may be stored in the RAM 106 before shipment from a factory or may be set by the user via the operation panel 104 (described below).

The image processing unit 108 performs the correction processing on a generated raster image. More specifically, the image processing unit 108 refers to the sheet position adjustment value corresponding to the selected sheet feeding cassette, and identifies the conveyance position, in the y-direction, of the sheet S conveyed from the selected sheet feeding cassette. Then, the image processing unit 108 identifies a range of the nozzles corresponding to the conveyance position of the sheet S, i.e., a range of the nozzles to be used in recording an image on the sheet S, and corrects pixel values of the raster image based on ejection characteristics of the identified range of the nozzles. In the present exemplary embodiment, quantization data is generated for every sheet feeding cassette selected as the sheet feeding cassette capable of feeding the sheet S in the processing target recording job. Details thereof will be described below. The image processing unit 108 quantizes the corrected raster image to generate quantization data, and stores the quantization data as spool data in the RAM 106.

Spool processing will be described now. To record an image corresponding to one page without stopping the conveyance of the sheet S, a complete set of data corresponding to one page is to be supplied to the recording head 8. Because image data is input to the recording apparatus 1 asynchronously with the conveyance of the sheet S, the spool processing is performed to accumulate intermediate data in the recording apparatus 1 in the middle of generating recording data from the input image data.

After the quantization data is generated, the main controller 101 erases the recording job data from the RAM 106. The main controller 101 acquires the sheet information about each of the first sheet feeding cassette 5A and the second sheet feeding cassette 5B via a print engine I/F 105. The main controller 101 then determines a sheet feeding cassette for feeding the sheet S in the processing target recording job, from among the sheet feeding cassettes selected by the recording cassette selection unit 110 as the sheet feeding cassette capable of feeding the sheet S. Thereafter, the main controller 101 transmits, to the print engine unit 200, various parameters for use in recording and the quantization data that corresponds to the determined sheet feeding cassette and is generated after the correction processing. The various parameters include part of the job attribute and the page attribute such as the sheet size and the sheet position adjustment value stored in the RAM 106.

Alternatively, the recording apparatus 1 may acquire the quantization data from the host apparatus 400 via wireless or wired communication, or may acquire the quantization data from an external storage device (a universal serial bus (USB) memory) connected to the recording apparatus 1. A communication method for use in wireless or wired communication is not specifically limited.

For example, a method in compliance with wireless technology standards such as Wi-Fi® or Bluetooth® is applicable as the communication method for use in wireless communication. USB is applicable as the communication method for use in wired communication. For example, in a case where a reading command is input from the host apparatus 400, the main controller 101 transmits the command to the scanner unit 3 via a scanner engine interface I/F 109.

The operation panel 104 is a mechanism for input to and output from the recording apparatus 1 by the user. The user can input an instruction to perform an operation such as copying or scanning, can set a recording mode, and can recognize information about the recording apparatus 1 via the operation panel 104.

In the print engine unit 200, the print controller 202 configured with a CPU controls various mechanisms of the printing unit 2 based on a program and various parameters stored in a ROM 203, using a RAM 204 as a work area. In a case where various commands and image data are received via a controller I/F 201, the print controller 202 temporarily stores the received commands and image data in the RAM 204. Then, the print controller 202 controls an image processing controller 205 to generate recording data from the stored quantization data in order to use the recording data in the recording operation by the recording head 8. After the recording data is generated, the print controller 202 controls the recording head 8, via a head I/F 206, to perform the recording operation based on the recording data. At this time, the print controller 202 drives the first feeding unit 6A, the second feeding unit 6B, the conveyance rollers 7, the discharge roller 12, and the flapper 11 illustrated in FIG. 1 via a conveyance control unit 207, and conveys the sheet S. Based on an instruction from the print controller 202, the recording head 8 performs the recording operation along with the operation of conveying the sheet S, so that an image is recorded on the sheet S.

A head carriage control unit 208 changes the orientation and position of the recording head 8 based on an operation state of the recording apparatus 1 such as the maintenance operation or the recording operation. An ink supply control unit 209 controls the ink supply unit 15 so that the pressure of the ink to be supplied to the recording head 8 falls within a suitable range. A maintenance control unit 210 controls operations of the cap unit 10 and the wiping unit 17 of the maintenance unit 16 during the maintenance operation for the recording head 8.

In the scanner engine unit 300, a hardware resource of a scanner controller 302 is controlled by the main controller 101 based on a program and various parameters stored in the ROM 107, using the RAM 106 as a work area. Accordingly, various mechanisms of the scanner unit 3 are controlled. For example, the main controller 101 controls the hardware resource in the scanner controller 302 via a controller I/F 301. Accordingly, the document placed on the ADF by the user is conveyed via a conveyance control unit 304 and read by a sensor 305. The read image data is stored in a RAM 303. The print controller 202 converts the image data obtained as described above into recording data so that the recording head 8 performs the recording operation based on the image data read by the scanner controller 302.

A program for implementing one or more functions of the recording apparatus 1 or the host apparatus 400 according to the present exemplary embodiment may be supplied to a system or an apparatus via a network or various storage media, and a computer (e.g., a CPU or a micro-processing unit (MPU)) of the system or the apparatus may read the program and execute the read program. Alternatively, the program may be executed by various mechanisms. In addition, the program may be executed by a single computer or a plurality of computers operating together. Furthermore, the above-described processing may not necessarily be entirely implemented by software and may partially or entirely be implemented by hardware such as an application-specific integrated circuit (ASIC). A single CPU may not necessarily perform the entire processing. A plurality of CPUs may cooperatively perform processing as appropriate, or a single CPU may perform any of the processing and a plurality of CPUs may cooperatively perform the other processing.

<Head Shading Processing>

Figure 10:
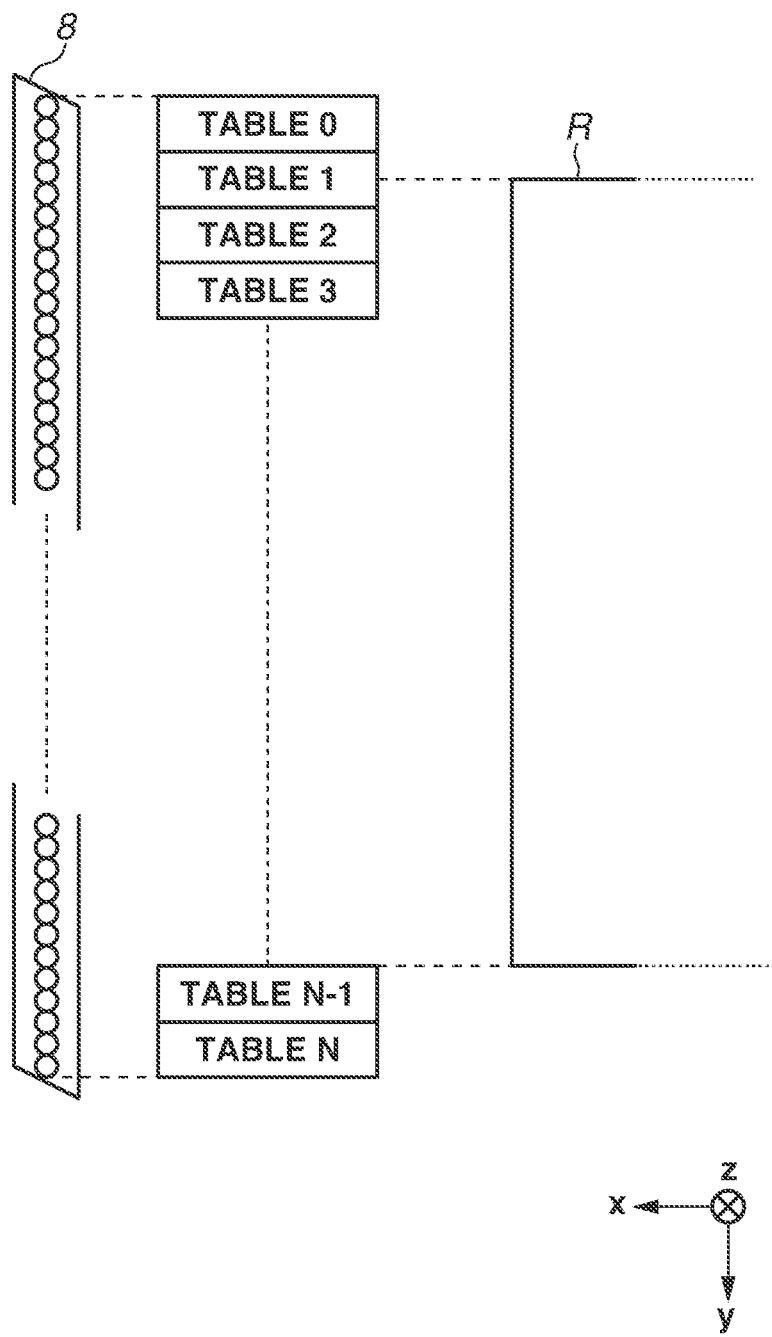
FIG. 10 is a diagram illustrating head shading (HS) processing.

Head shading processing (hereinafter referred to as "HS processing") will be described with reference to FIG. 10. The plurality of nozzles of the recording head 8 has different ejection characteristics. The ejection characteristics vary depending on a size of an ink droplet to be ejected, displacement of an ejection direction of the ink droplet, and the like. Thus, even in a case where an image is recorded based on the image data having uniform density, density of the recorded image may not be uniform due to the ejection characteristic variation.

To address this issue, the HS processing prevents an occurrence of nonuniform density. The HS processing is implemented by grouping a predetermined number of nozzles in a nozzle array of the recording head 8 as one nozzle group and then performing one-dimensional color conversion lookup table (LUT) processing using a different piece of lookup table (LUT) data for each of unit regions corresponding to the respective nozzle groups. For example, for the nozzle group that ejects a larger ink droplet amount than a reference amount, multivalued image data is corrected to reduce the number of ink droplets to be applied to the unit region where recording using this nozzle group is to be performed. The foregoing correction processing makes it possible to obtain a substantially uniform recording density even in a case where the ejection characteristic variation occurs among the nozzles in the nozzle array, thereby preventing the occurrence of nonuniform density.

Before the HS processing, a multivalued raster image R is generated from the input data, and nozzle positions where pixels of the image R are to be recorded respectively are identified. After the correction by the HS processing (the HS correction processing) is performed based on the identified nozzle positions, the quantization processing is performed to generate quantization data. The correction processing may be performed in units of one nozzle or in units of a plurality of nozzles such as four nozzles or eight nozzles.

<Relationship Between Sheet Feeding Source Change and Correction Processing>

An issue with the above-described correction processing that arises in changing the sheet feeding source will be described. The recording apparatus 1 is capable of holding the sheets S of the same size and the same type in the plurality of sheet feeding cassettes (the first sheet feeding cassette 5A and the second sheet feeding cassette 5B). Thus, in a case where all the sheets S in the selected sheet feeding cassettes are used during the recording operation, the sheet feeding source is changed to another sheet feeding cassette holding the sheets S of the same size and the same type so that the recording operation is continued. The sheet feeding source may be changed manually by the user, or may be changed automatically by the recording apparatus 1 using an auto cassette change (ACC) function.

In addition, the position of the sheet S conveyed to a region where the recording head 8 performs recording varies depending on the sheet feeding cassette due to an error in manufacturing the conveyance path from the sheet feeding cassette to the recording head 8. In the above-described HS processing, the image data is corrected considering the characteristic of each nozzle of the recording head 8, but the conveyance position of the sheet S conveyed from each sheet feeding cassette is also to be considered. Thus, the correction data is generated using the displacement of the conveyance position of the sheet S conveyed from each sheet feeding cassette as an adjustment value from a reference conveyance position. Hereinafter, the adjustment value will be referred to as the "sheet position adjustment value".

In the above-described spool processing, the image data is stored in a volatile storage device, such as a dynamic RAM (DRAM), or a non-volatile storage device, such as a hard disk drive (HDD) or a flash memory. The volatile storage device and the non-volatile storage device are desirably low in capacity. Thus, quantized image data (quantization data) is more suitable as spool data than the multivalued raster image because the quantization data is smaller in size than the multivalued raster image.

Meanwhile, the above-described HS correction processing is to be performed before the quantization processing. Since the HS correction processing for correcting the recording characteristic of each nozzle is to be performed after the positional relationship between the raster image and each nozzle is determined, the conveyance position of the sheet S conveyed from each sheet feeding cassette is also to be considered in advance. In other words, in a case where the quantization data is spooled, which of the sheet feeding cassettes is to feed the sheet S is to be determined before the HS correction processing.

In a case where the sheet feeding source is changed to another sheet feeding cassette during the recording operation, the sheet S is to be fed from the sheet feeding cassette different from the sheet feeding cassette determined at the time of generating the correction data. If the sheet position adjustment value corresponding to the sheet feeding cassette before the change and the sheet position adjustment value corresponding to the sheet feeding cassette after the change are greatly different from each other, the relationship between the raster image and the recording characteristic of each nozzle that is considered in the HS correction processing is no longer satisfied, and an issue of a decrease in recording image quality arises.

To address this issue, in the present exemplary embodiment, correction data is generated considering the change of the sheet feeding source, and pieces of quantization data corresponding to the plurality of sheet feeding cassettes are prepared.

<Correction Processing Using Sheet Position Adjustment Value Set for Each Sheet Feeding Cassette>

A result of recording on the sheet S in a case where the correction processing is performed using the sheet position adjustment value corresponding to each sheet feeding cassette will be described with reference to FIGS. 8A to 8F. The components and control configuration of the recording apparatus 1 are as described above with reference to FIGS. 1 and 2.

A configuration in which both the first sheet feeding cassette 5A and the second sheet feeding cassette 5B hold the A4-size plain sheets (the sheets S) will be described. It is assumed that the sheets S held by the first sheet feeding cassette 5A are fed first, and when all the sheets S held by the first sheet feeding cassette 5A are used, the sheets S held by the second sheet feeding cassette 5B are fed and conveyed to continue the recording operation.

A sheet position adjustment value A set for the first sheet feeding cassette 5A, correction image data I, and an image Sa recorded using the sheet position adjustment value A and the correction image data I will be described with reference to FIGS. 8A to 8C.

FIG. 8A illustrates a positional relationship between the sheet S fed from the first sheet feeding cassette 5A, and the recording head 8. In FIG. 8A, the recording head 8 includes a nozzle group 8b, and an amount of one ink droplet to be ejected from each nozzle of the nozzle group 8b is less than a standard amount, whereas an amount of one ink droplet to be ejected from each nozzle other than the nozzles of the nozzle group 8b is equal to the standard amount. The sheet S fed from the first sheet feeding cassette 5A is conveyed toward the x-direction, which is the conveyance direction, while being displaced rightward from a reference position indicated by an arrow. The amount of displacement of the conveyance position corresponds to the sheet position adjustment value A in the y-direction. As described above, the sheet position adjustment value A corresponding to the first sheet feeding cassette 5A is set before shipment from the factory or is set by the user, and is stored in the RAM 106.

FIG. 8B illustrates the correction image data I generated by the image processing unit 108. Input multivalued image data is corrected by referring to the sheet position adjustment value A and the position of the nozzle group 8b so that the density of the region where recording using the nozzle group 8b is to be performed is increased, i.e., the pixel values of the region are increased. Then, the correction image data I illustrated in FIG. 8B and the sheet position adjustment value A are transmitted to the print engine unit 200, so that the image Sa is recorded on the sheet S. FIG. 8C illustrates the image Sa recorded on the sheet S. In FIG. 8C, the image Sa without density unevenness is recorded at an appropriate position on the sheet S.

Assuming a case where an image is recorded on the sheet S fed from the second sheet feeding cassette 5B based on the correction image data I corrected using the sheet position adjustment value A corresponding to the first sheet feeding cassette 5A, images Sb and Sc as results of the recording will be described with reference to FIGS. 8D to 8F.

In the print engine unit 200, the print controller 202 detects the first sheet feeding cassette 5A as being in a state of "no sheet". Based on the detection result, the print controller 202 notifies the controller unit 100 of information indicating that the first sheet feeding cassette 5A is in the state of "no sheet" and a recording job cancellation instruction for the first sheet feeding cassette 5A, via the controller I/F 201.

In the controller unit 100, the recording job data corresponding to the first sheet feeding cassette 5A is erased from the RAM 106 based on the cancellation instruction from the print controller 202. Here, a case where the main controller 101 performs recording on the sheet S fed from the second sheet feeding cassette 5B, using the correction image data I generated using the sheet position adjustment value A corresponding to the first sheet feeding cassette 5A will be described. The sheet position adjustment value corresponding to the second sheet feeding cassette 5B is zero.

FIG. 8E illustrates the image Sb printed in a case where the main controller 101 transmits the correction image data I and the sheet position adjustment value A to the print engine unit 200. The image Sb is recorded at an image position moved based on the sheet position adjustment value A. The lower density due to the nozzle group 8b is corrected and the image Sb does not have color unevenness. However, since the sheet S fed from the second sheet feeding cassette 5B is conveyed to the reference position, the sheet position and the image position are misaligned with each other, and the image Sb with a missing part is obtained as the recording result.

FIG. 8F illustrates the image Sc printed in a case where the main controller 101 transmits the correction image data I and the sheet position adjustment value corresponding to the second sheet feeding cassette 5B, which is zero, to the print engine unit 200. The image Sc is based on the correction image data I generated considering the density characteristics of the nozzles, but is in a state where the nozzle positions and the corrected image data position are misaligned with each other. Thus, a region having the output from the nozzles other than the nozzle group 8b based on the data corrected considering the lower density due to the nozzle group 8b is dark, whereas a region having the output from the nozzle group 8b based on uncorrected data is light. As a result, the image Sc with density unevenness is obtained.

As described above, in a case where a sheet feeding cassette, a sheet position adjustment value indicating the conveyance position of the sheet fed from the sheet feeding cassette, and correction data generated using a sheet position adjustment value in consideration of the characteristics of the nozzles do not correspond to one another, an intended recorded image may not be obtained. To address this issue, in the present exemplary embodiment, the recording apparatus 1 including the plurality of sheet feeding cassettes (the first sheet feeding cassette 5A and the second sheet feeding cassette 5B) generates pieces of correction data corresponding to two or more sheet feeding cassettes, considering the change of the sheet feeding source in case of running out of sheets. This prevents printing of an image that is not intended by the user due to the mismatched condition described above in a case where the sheet feeding source is changed to another sheet feeding cassette at the time of running out of sheets.

Figure 3:
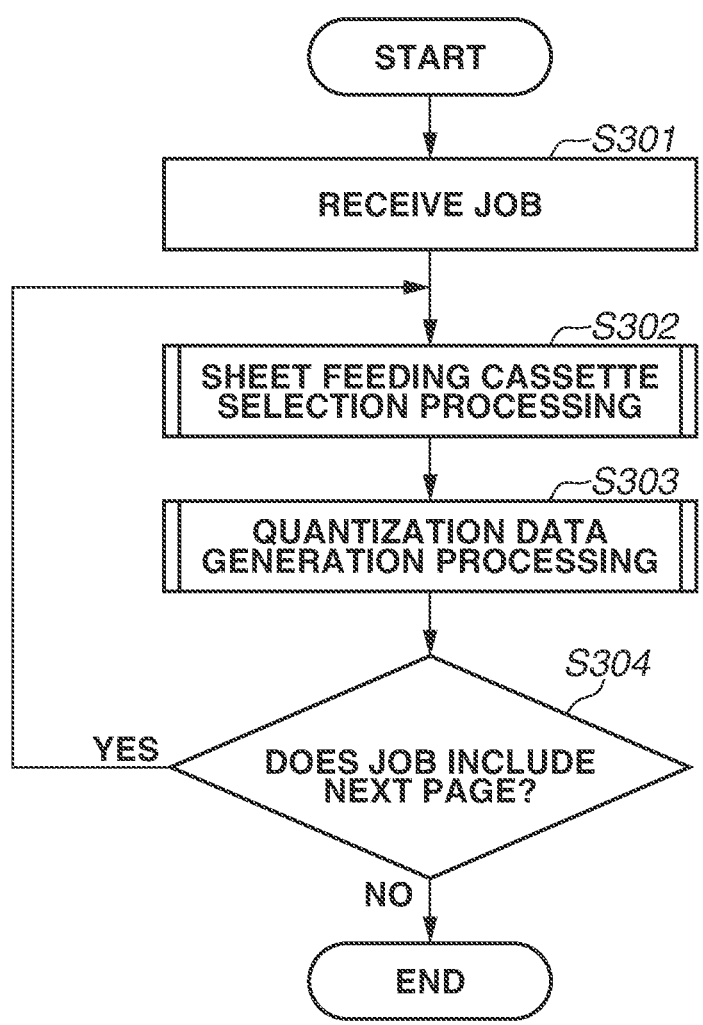
FIG. 3 is a flowchart illustrating processing from generation of quantization data from a job to storage of the quantization data as spool data.

FIG. 3 is a flowchart illustrating processing from the generation of quantization data from a job to the storage of the quantization data as spool data according to the present exemplary embodiment. In step S301, a job is received from the host apparatus 400 via the host I/F 102, and the received job is stored as input data in the RAM 106. In step S302, a sheet feeding cassette holding a recording medium on which an image of a first page of the input data is recordable is selected. At this time, one sheet feeding cassette or a plurality of sheet feeding cassettes is selected. In step S303, quantization data corresponding to the selected sheet feeding cassette or each selected sheet feeding cassette is generated and then stored in the RAM 106 as spool data associated with the selected sheet feeding cassette or each selected sheet feeding cassette. To reduce a size of the spool data as described below, the association between the spool data and the selected sheet feeding cassette or each selected sheet feeding cassette may be a one-to-many relationship. In step S304, whether the job includes a next page is determined. In a case where the job includes a next page (YES in step S304), the processing returns to step S302, and the same processing is performed on the next page. On the other hand, in a case where the job does not include a next page (NO in step S304), the input data is erased from the RAM 106, and the processing from the generation of the quantization data from the job to the storage of the quantization data as the spool data ends.

Figure 4:
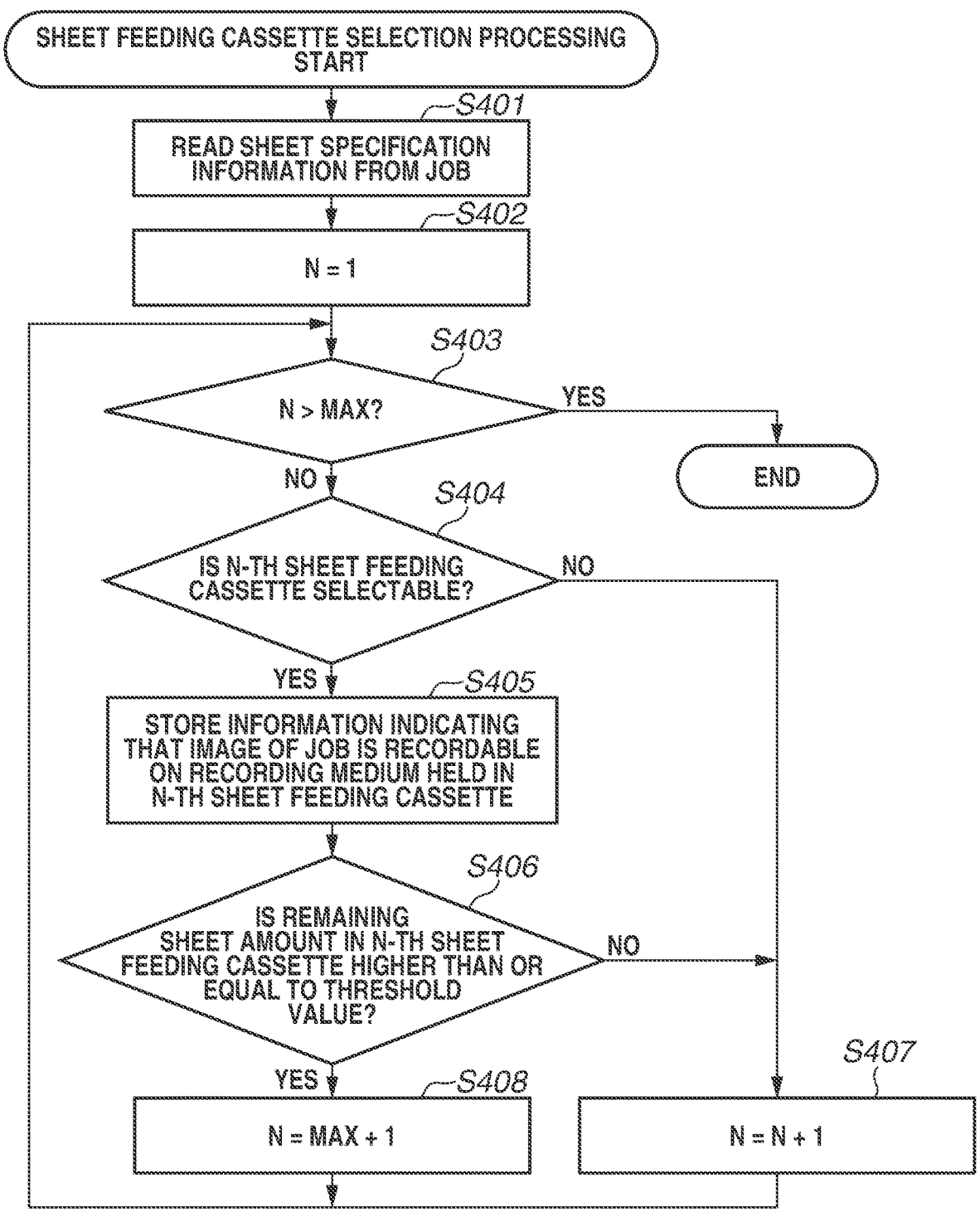
FIG. 4 is a flowchart illustrating sheet feeding cassette selection processing.

FIG. 4 is a flowchart illustrating the sheet feeding cassette selection processing in step S302. In step S401, sheet specification information is read from the job attribute and page attribute of the job stored as the input data in the RAM 106. In step S402, a number N indicating a sheet feeding cassette is initialized. In the present exemplary embodiment, the number N is initialized to one based on the assumption that the sheet feeding cassettes are used in order of priority starting with the first sheet feeding cassette 5A. In step S403, whether the number N exceeds a maximum number MAX of sheet feeding cassettes is determined. Since the recording apparatus 1 according to the present exemplary embodiment includes two sheet feeding cassettes (the first sheet feeding cassette 5A and the second sheet feeding cassette 5B), the maximum number MAX is two. In a case where the number N exceeds the maximum number MAX (YES in step S403), the sheet feeding cassette selection processing ends. On the other hand, in a case where the number N does not exceed the maximum number MAX (NO in step S403), the processing proceeds to step S404. In step S404, whether the N-th sheet feeding cassette is selectable for recording is determined. This determination is performed by referring to the sheet specification information read in step S401 and the sheet information about the N-th sheet feeding cassette that is stored in the RAM 106. In the present exemplary embodiment, comparison of the sheet sizes and the sheet types as the sheet information is performed. In a case where the sheet sizes and the sheet types both match, it is determined that an image of the job is recordable on a recording medium held in the N-th sheet feeding cassette. In a case where it is determined that an image of the job is not recordable on a recording medium held in the N-th sheet feeding cassette (NO in step S404), the processing proceeds to step S407. In step S407, the number N is increased by one, and the processing returns to step S403. On the other hand, in a case where it is determined that an image of the job is recordable on a recording medium held in the N-th sheet feeding cassette (YES in step S404), the processing proceeds to step S405. In step S405, information indicating that the image of the job is recordable on the recording medium held in the N-th sheet feeding cassette is stored. In step S406, the remaining sheet amount (the number of sheets) in the N-th sheet feeding cassette that is stored in the RAM 106 is acquired, and whether the remaining sheet amount is higher than or equal to a threshold value is determined. In a case where the remaining sheet amount is higher than or equal to the threshold value (YES in step S406), the processing proceeds to step S408. In step S408, the number N is set to the maximum number MAX+1, and the processing returns to step S403. This indicates that any other sheet feeding cassette is not to be evaluated in the subsequent processing. More specifically, it is determined that the target sheet feeding cassette holds a sufficient number of sheets and it is unnecessary to generate spool data for any other sheet feeding cassette considering a possibility of running out of sheets. As described above, in a case where the remaining sheet amount in the target sheet feeding cassette is sufficient, it is unnecessary to generate a plurality of pieces of spool data, so that an impact on the processing speed and memory is reduced. On the other hand, in a case where the remaining sheet amount in the N-th sheet feeding cassette is less than the threshold value (NO in step S406), the processing proceeds to step S407. In step S407, the number N is increased by one, and the processing returns to step S403. In step S403, in a case where the number N exceeds the maximum number MAX of sheet feeding cassettes (YES in step S403), the one or more sheet feeding cassettes determined as selectable so far are determined as the cassette(s) with which recording based on the recording job can be performed, and the processing of step S302 ends.

Figure 5:
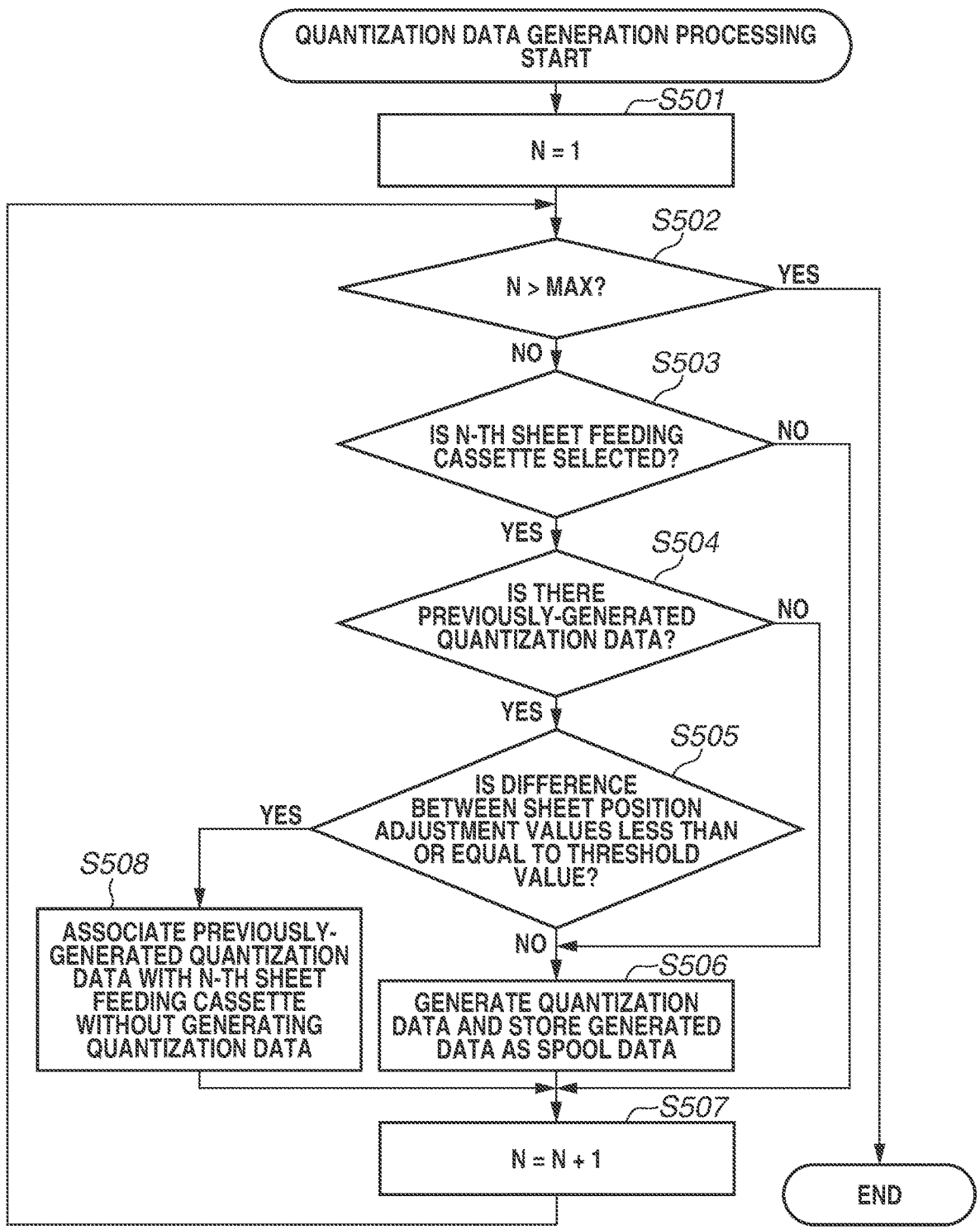
FIG. 5 is a flowchart illustrating quantization data generation processing.

FIG. 5 is a flowchart illustrating the quantization data generation processing in step S303. In step S501, the number N indicating a sheet feeding cassette is initialized. As described above, in the present exemplary embodiment, the sheet feeding cassettes are used in order of priority starting with the first sheet feeding cassette 5A. In step S502, whether the number N exceeds the maximum number MAX of sheet feeding cassettes is determined. Since the recording apparatus 1 according to the present exemplary embodiment includes two sheet feeding cassettes (the first sheet feeding cassette 5A and the second sheet feeding cassette 5B), the maximum number MAX is two.

In a case where the number N exceeds the maximum number MAX (YES in step S502), the quantization data generation processing ends. On the other hand, in a case where the number N does not exceed the maximum number MAX (NO in step S502), the processing proceeds to step S503. In step S503, whether the N-th sheet feeding cassette is a cassette selected in the sheet feeding cassette selection processing in step S302 is determined. In a case where the N-th sheet feeding cassette is not a selected cassette (NO in step S503), the processing proceeds to step S507. In step S507, the number N is increased by one, and the processing returns to step S502.

On the other hand, in a case where the N-th sheet feeding cassette is a selected cassette (YES in step S503), the processing proceeds to step S504. In step S504, whether there is quantization data that is previously generated for any other sheet feeding cassette is determined. In a case where it is determined that there is no quantization data generated for any other sheet feeding cassette (NO in step S504), the processing proceeds to step S506. In step S506, quantization data is generated and then stored as spool data. In step S507, the number N is increased by one, and the processing returns to step S502. On the other hand, in a case where it is determined that there is quantization data generated for any other sheet feeding cassette (YES in step S504), the processing proceeds to step S505. In step S505, the sheet position adjustment value corresponding to the sheet feeding cassette for which the quantization data is previously generated and the sheet position adjustment value corresponding to the N-th sheet feeding cassette being a determination target are acquired, and the difference between the acquired sheet position adjustment values is calculated. In a case where the difference between the sheet position adjustment values is less than or equal to a threshold value (YES in step S505), it is determined that an impact on recording quality is small, and the processing proceeds to step S508. In step S508, no quantization data is generated, and the existing quantization data is associated with the N-th sheet feeding cassette. More specifically, it is determined to use the previously-generated quantization data as quantization data for the N-th sheet feeding cassette. At this time, the same data may be copied and the copied data may be stored as quantization data for the N-th sheet feeding cassette.

At this time, in a case where there is a plurality of pieces of previously-generated quantization data, it is desirable to use the quantization data having the sheet position adjustment value with the least difference from the sheet position adjustment value corresponding to the N-th sheet feeding cassette. In step S507, the number N is increased by one, and the processing returns to step S502.

On the other hand, in a case where the difference from the sheet position adjustment value corresponding to the sheet feeding cassette for which quantization data is previously generated is greater than the threshold value (NO in step S505), the processing proceeds to step S506. In step S506, quantization data for the N-th sheet feeding cassette is generated and then stored as spool data. As a result, quantization data for the N-th sheet feeding cassette is generated in addition to the previously-generated quantization data, and the pieces of quantization data corresponding to the plurality of sheet feeding cassettes are stored.

The foregoing processing is repeated to generate quantization data corresponding to the sheet position adjustment value of the sheet feeding cassette selected in step S302 as the cassette with which recording can be performed. In a case where the difference of the sheet position adjustment value of the sheet feeding cassette is small, a single piece of quantization data is used for a plurality of sheet feeding cassettes to reduce the impact of generating a plurality of pieces of spool data on the processing speed and memory. At this time, the quantization data is stored in the RAM 106 as spool data associated with the selected sheet feeding cassette or each selected sheet feeding cassette. The quantization data may be losslessly compressed and then stored.

FIG. 6 is a diagram illustrating an example of association between each selected sheet feeding cassette and spool data.

Each piece of spool data is given a single spool identifier (spool ID) and managed. A spool ID, an address where spool data is stored, a spool data size, a job ID, a page number, and a corresponding sheet feeding cassette are stored in association with each other in the RAM 106 as a single piece of spool management data. In FIG. 6, spool data with the spool ID "0001" is stored from 0x80000000 in the RAM 106 and has a spool data size of 0x2000 bytes. In addition, the spool data is data on page 1 of the job ID "0003" and is quantization data corresponding to the first sheet feeding cassette 5A. Spool data of the spool ID "0003" is stored from 0x80004000 in the RAM 106 and has a spool data size of 0x2000 bytes. In addition, the spool data is data on page 1 of the job ID "0004" and is quantization data corresponding to the first sheet feeding cassette 5A and the second sheet feeding cassette 5B. This indicates that after the quantization data for the first sheet feeding cassette 5A is generated in step S303, no quantization data is generated for the second sheet feeding cassette 5B, and the second sheet feeding cassette 5B is associated with the quantization data for the first sheet feeding cassette 5A.

Figure 7:
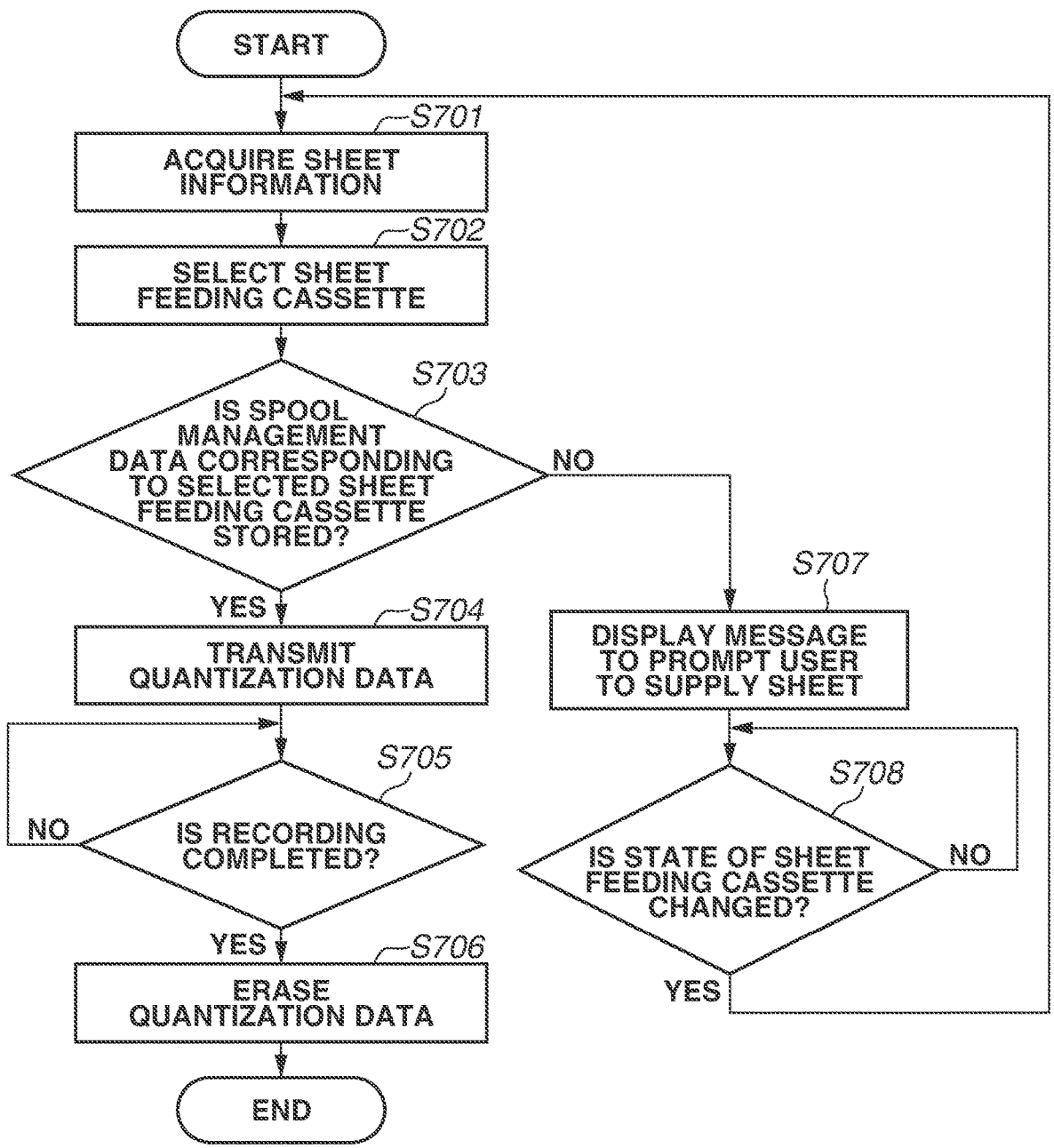
FIG. 7 is a flowchart illustrating recording processing.

After the quantization data is stored as spool data, the recording operation is performed. FIG. 7 is a flowchart illustrating processing for performing the recording operation. In step S701, the main controller 101 acquires sheet information about the first sheet feeding cassette 5A and sheet information about the second sheet feeding cassette 5B via the print engine I/F 105. In step S702, the main controller 101 refers to the job attribute and page attribute of the job stored as the input data in the RAM 106, and the sheet information about the first sheet feeding cassette 5A and the sheet information about the second sheet feeding cassette 5B that are acquired in step S701, and selects a sheet feeding cassette to be used to feed the sheet S in the recording operation this time. In the present exemplary embodiment, the main controller 101 refers to the sheet size and the sheet type as the sheet information about the recording job, and selects the sheet feeding cassette that satisfies both the sheet size and sheet type as the sheet feeding cassette to be used to feed the sheet S.

In step S703, the main controller 101 determines whether spool management data corresponding to the selected sheet feeding cassette is stored. In a case where the spool management data is stored (YES in step S703), the processing proceeds to step S704. On the other hand, in a case where the spool management data is not stored (NO in step S703), the processing proceeds to step S707. In step S704, the main controller 101 transmits various parameters for the recording operation and the quantization data for the selected sheet feeding cassette to the print engine unit 200 via the print engine I/F 105. In step S705, the main controller 101 waits until the recording operation is completed. In step S706, the main controller 101 erases the spool management data and the quantization data on the recorded page.

In a case where no specified quantization data is stored in spool management data in step S703, it is considered that there is a change in state of the sheet feeding cassette during a period from the job reception to the determination in step S703. In this case, the recording processing is temporarily stopped in step S707, and the operation panel 104 displays a message prompting the user to supply sheets to the sheet feeding cassette corresponding to the spool management data. In step S708, a change in state of the sheet feeding cassette is waited. More specifically, supply of sheets to the sheet feeding cassette by the user is waited. In a case where supply of sheets to the sheet feeding cassette is detected (YES in step S708), the processing returns to step S701, and the processing is continued.

As described above, in the present exemplary embodiment, when quantization data is generated, one or more sheet feeding cassettes with which recording can be performed are selected. Then, a single piece of quantization data or a plurality of pieces of quantization data is generated based on the sheet position adjustment value corresponding to the selected sheet feeding cassette or each selected sheet feeding cassette, using a correction value corresponding to the sheet conveyance position of the selected sheet feeding cassette or each sheet feeding cassette and considering the recording characteristics of the recording elements, and then the quantization data is spooled. During the recording processing, recording is performed using the spool data corresponding to the sheet feeding cassette with which recording is to be performed. With this configuration, in a case where the sheet feeding cassette feeding sheets runs out of sheets during the recording operation, the sheet feeding source is changed to another sheet feeding cassette to continue the recording operation. At this time, in response to the change of the sheet feeding source, the quantization data for use in the recording operation is also changed. The recording operation is continued using the quantization data corresponding to the sheet position adjustment value set for the sheet feeding cassette that is newly set as the sheet feeding source. In order to change the quantization data, the quantization data corresponding to the sheet position adjustment value set for the selected sheet feeding cassette or each sheet feeding cassette is generated in advance. As described above, the same quantization data may be associated with the plurality of sheet feeding cassettes having the sheet position adjustment values that are close to each other.

With the foregoing configuration, in a case where the sheet feeding source is changed to another sheet feeding cassette having a different sheet position adjustment value during the recording operation, a high-quality image corresponding to the positional relationship between the sheet feeding cassette and the recording elements is recorded while an increase in size of data to be spooled is prevented.

While in the above-described exemplary embodiment, the selectability determination is performed on every sheet feeding cassette, the selectability determination may be performed on a plurality of sheet feeding cassettes.

The configuration of the recording apparatus 1 illustrated in FIG. 2 is a mere example and the present exemplary embodiment is not limited thereto. The units may be controlled by the same controller.

According to the exemplary embodiment of the present disclosure, when quantization data is generated, one or more sheet feeding cassettes with which recording can be performed are selected. Then, the sheet position adjustment value corresponding to the selected sheet feeding cassette or each selected sheet feeding cassette is referred to, and a single piece of quantization data or a plurality of pieces of quantization data is generated and spooled. During the recording processing, recording is performed using the spool data corresponding to the sheet feeding cassette with which recording is to be performed. With this configuration, in a case where the sheet feeding cassette runs out of sheets and the sheet feeding source is changed to another sheet feeding cassette to continue the recording during the recording processing, the recording is performed using the quantization data generated by referring to the sheet position adjustment value corresponding to the sheet feeding cassette newly set as the sheet feeding source. This makes it possible to change the sheet feeding source to another sheet feeding cassette having a different sheet position adjustment value and continue the recording without decreasing the recording quality while reducing the size of the data to be spooled.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-036216, filed Mar. 8, 2021, which is hereby incorporated by reference herein in its entirety.

What is claimed is:

1. A recording apparatus comprising:
 a recording unit configured to record an image on a recording medium conveyed in a second direction, wherein the recording unit records the image by using a plurality of recording elements arranged along a first direction intersecting with the second direction;
 a first holding unit and a second holding unit each configured to hold a plurality of recording media;
 a generation unit configured to generate first correction data and second correction data based on an input recording job, wherein the generation unit generates the first correction data based on input image data and a first adjustment value indicating a conveyance position, in the first direction, of a recording medium fed from the first holding unit, and generates the second correction data based on the input image data and a second adjustment value indicating a conveyance position, in the first direction, of a recording medium fed from the second holding unit; and
 a control unit configured to control the recording unit, wherein the control unit controls the recording unit to record an image on the recording medium fed from the first holding unit based on the first correction data, and to record an image on the recording medium fed from the second holding unit based on the second correction data.

2. The recording apparatus according to claim 1, further comprising a storage unit configured to temporarily store the first correction data and the second correction data that are generated by the generation unit.

3. The recording apparatus according to claim 1,
 wherein the input image data is multivalued image data,
 wherein the generation unit generates first multivalued image data based on the input image data and the first adjustment value, and generates the first correction data by quantizing the first multivalued image data, and
 wherein the generation unit generates second multivalued image data based on the input image data and the second adjustment value, and generates the second correction data by quantizing the second multivalued image data.

4. The recording apparatus according to claim 1, wherein the control unit changes a recording medium feeding source from the first holding unit to the second holding unit during a recording operation for the input recording job.

5. The recording apparatus according to claim 1, wherein the generation unit generates the first correction data by correcting the input image data based on the first adjustment value and a recording characteristic of each of the plurality of recording elements, and generates the second correction data by correcting the input image data based on the second adjustment value and the recording characteristic of each of the plurality of recording elements.

6. The recording apparatus according to claim 1, further comprising a selection unit configured to select, from among a plurality of holding units including the first holding unit and the second holding unit, one or more holding units capable of feeding a recording medium for performing a recording operation for the input recording job,
wherein the generation unit generates correction data for each holding unit selected by the selection unit, based on an adjustment value corresponding to each holding unit selected by the selection unit.

7. The recording apparatus according to claim 1, wherein the second holding unit holds the plurality of recording media of a same size and a same type as the plurality of recording media held by the first holding unit.

8. The recording apparatus according to claim 1, further comprising a detection unit configured to detect an amount of the plurality of recording media held by the first holding unit,
wherein, in a case where the amount of the plurality of recording media detected by the detection unit is less than or equal to a predetermined threshold value, the generation unit generates the second correction data.

9. A recording apparatus comprising:
a recording unit configured to record an image on a recording medium conveyed in a second direction, wherein the recording unit records the image by using a plurality of recording elements arranged along a first direction intersecting with the second direction;
a first holding unit and a second holding unit each configured to hold a plurality of recording media;
an acquisition unit configured to acquire a first adjustment value and a second adjustment value, wherein the first adjustment value indicates a conveyance position, in the first direction, of a recording medium fed from the first holding unit, and the second adjustment value indicates a conveyance position, in the first direction, of a recording medium fed from the second holding unit; and
a generation unit configured to generate first correction data for recording an image on the recording medium fed from the first holding unit, based on input image data and the first adjustment value,
wherein, in a case where a difference between the first adjustment value and the second adjustment value is greater than a predetermined threshold value, the generation unit generates second correction data for recording an image on the recording medium fed from the second holding unit.

10. The recording apparatus according to claim 9, wherein, in a case where the difference is less than the predetermined threshold value, the generation unit associates the first correction data with the second holding unit, as correction data for recording the image on the recording medium fed from the second holding unit.

11. A recording method for a recording apparatus that includes a first holding unit and a second holding unit each configured to hold a plurality of recording media, and includes a recording unit configured to record an image on a recording medium conveyed in a second direction, wherein the recording unit records the image by using a plurality of recording elements arranged along a first direction intersecting with the second direction, the recording method comprising:

generating first correction data and second correction data based on an input recording job, wherein the generating includes generating the first correction data based on input image data and a first adjustment value indicating a conveyance position, in the first direction, of a recording medium fed from the first holding unit, and includes generating the second correction data based on the input image data and a second adjustment value indicating a conveyance position, in the first direction, of a recording medium fed from the second holding unit; and controlling the recording unit, wherein the controlling includes controlling the recording unit to record an image on the recording medium fed from the first holding unit based on the first correction data, and to record an image on the recording medium fed from the second holding unit based on the second correction data.

12. A non-transitory computer-readable storage medium storing a program to cause a computer to perform a recording method for a recording apparatus that includes a first holding unit and a second holding unit each configured to hold a plurality of recording media, and includes a recording unit configured to record an image on a recording medium conveyed in a second direction, wherein the recording unit records the image by using a plurality of recording elements arranged along a first direction intersecting with the second direction, the recording method comprising:

generating first correction data and second correction data based on an input recording job, wherein the generating includes generating the first correction data based on input image data and a first adjustment value indicating a conveyance position, in the first direction, of a recording medium fed from the first holding unit, and includes generating the second correction data based on the input image data and a second adjustment value indicating a conveyance position, in the first direction, of a recording medium fed from the second holding unit; and controlling the recording unit, wherein the controlling includes controlling the recording unit to record an image on the recording medium fed from the first holding unit based on the first correction data, and to record an image on the recording medium fed from the second holding unit based on the second correction data.

* * * * *